US010951422B2

(12) United States Patent
Marinho

(10) Patent No.: US 10,951,422 B2
(45) Date of Patent: Mar. 16, 2021

(54) MOBILE MESSAGE SOURCE AUTHENTICATION

(71) Applicant: CTIA—The Wireless Association, Washington, DC (US)

(72) Inventor: John A. Marinho, Vienna, VA (US)

(73) Assignee: CTIA—The Wireless Association, Washington, DC (US)

( * ) Notice: Subject to any disclaimer, the term of this patent is extended or adjusted under 35 U.S.C. 154(b) by 149 days.

(21) Appl. No.: 15/902,477

(22) Filed: Feb. 22, 2018

(65) Prior Publication Data
US 2018/0241575 A1  Aug. 23, 2018

Related U.S. Application Data

(60) Provisional application No. 62/554,799, filed on Sep. 6, 2017, provisional application No. 62/548,630, filed
(Continued)

(51) Int. Cl.
*H04L 9/32* (2006.01)
*H04W 12/06* (2021.01)
(Continued)

(52) U.S. Cl.
CPC .......... *H04L 9/3268* (2013.01); *H04L 9/3252* (2013.01); *H04L 63/0823* (2013.01);
(Continued)

(58) Field of Classification Search
CPC . H04L 9/3268; H04L 63/0823; H04L 63/126; H04L 63/1483; H04L 9/3252;
(Continued)

(56) References Cited

U.S. PATENT DOCUMENTS 6,501,569 B1 * 12/2002 Kitakado ........... H04N 1/00392
358/435
7,107,618 B1 * 9/2006 Gordon .................. G06F 21/56
709/206
(Continued)

FOREIGN PATENT DOCUMENTS

EP    3367716    8/2018

OTHER PUBLICATIONS

British Application No. GB1802909.0; Combined Search and Examination Report Under Sections 17 and 18(3); dated Jul. 12, 2018, 10 pages.
(Continued)

*Primary Examiner* — Aravind K Moorthy
(74) *Attorney, Agent, or Firm* — Fitch, Even, Tabin & Flannery LLP

(57) ABSTRACT

A control circuit receives from a mobile receiver a request for a certificate for a particular sourcing entity and responsively transmits to that mobile receiver a corresponding certificate. The certificate includes an entity logo that corresponds to a particular message sourcing entity and decryption information. The mobile receiver can employ the decryption information to decrypt an encrypted authenticated entity digital signature to thereby authenticate that a mobile message that included the signature was sourced by a particular sourcing entity and to also display the entity logo in conjunction with presenting the message sourced by the sourcing entity to thereby provide visual confirmation that the sourcing entity is indeed an authenticated source of the message. Presentation of the entity logo can be in combination with an additional graphic feature that specifically and uniquely represents and communicates that confirmed authentication (i.e., that the displayed logo in fact corresponds to the entity that sourced the message).

12 Claims, 10 Drawing Sheets

Related U.S. Application Data on Aug. 22, 2017, provisional application No. 62/462,185, filed on Feb. 22, 2017.

(51) Int. Cl.
*H04L 29/06* (2006.01)
*H04W 12/12* (2021.01)
*H04W 4/12* (2009.01)
*H04W 12/04* (2021.01)
*H04W 12/00* (2021.01)

(52) U.S. Cl.
CPC ........ *H04L 63/126* (2013.01); *H04L 63/1483* (2013.01); *H04W 4/12* (2013.01); *H04W 12/04* (2013.01); *H04W 12/06* (2013.01); *H04W 12/12* (2013.01); *H04L 2209/80* (2013.01); *H04W 12/00522* (2019.01)

(58) Field of Classification Search
CPC ... H04L 2209/80; H04L 9/321; H04L 9/3247; H04W 12/12; H04W 4/12; H04W 12/04; H04W 12/06; H04W 12/00522
USPC .......................................................... 713/158
See application file for complete search history.

(56) References Cited

U.S. PATENT DOCUMENTS

| | | | | |
|---|---|---|---|---|
| 7,663,670 | B1* | 2/2010 | Orboubadian | H04N 9/045 348/231.2 |
| 8,220,047 | B1* | 7/2012 | Soghoian | H04L 51/14 709/206 |
| 9,559,849 | B1* | 1/2017 | Wasiq | H04L 9/3247 |
| 9,689,686 | B1* | 6/2017 | Carmack | H04K 3/90 |
| 9,932,290 | B2 | 4/2018 | Petrie et al. | |
| 2002/0016916 | A1* | 2/2002 | Natarajan | H04N 1/32144 713/179 |
| 2002/0080276 | A1* | 6/2002 | Mori | H04N 21/4316 348/553 |
| 2006/0170958 | A1* | 8/2006 | Jung | H04N 1/00137 358/1.15 |
| 2006/0218403 | A1* | 9/2006 | Sauve | H04L 63/126 713/175 |
| 2007/0255953 | A1* | 11/2007 | Peyret | H04L 9/32 713/168 |
| 2008/0187119 | A1* | 8/2008 | Vinokurov | H04L 63/08 379/142.05 |
| 2009/0015876 | A1* | 1/2009 | Brown | H04N 1/32112 358/405 |
| 2009/0077373 | A1 | 3/2009 | Kramer | |
| 2010/0070761 | A1 | 3/2010 | Gustave | |
| 2010/0100743 | A1* | 4/2010 | Ali | H04L 9/3247 713/176 |
| 2010/0158308 | A1* | 6/2010 | Walker | H04N 21/8352 382/100 |
| 2010/0318791 | A1* | 12/2010 | Shamsaasef | H04L 63/0823 713/158 |
| 2011/0258700 | A1 | 10/2011 | Chow | |
| 2012/0143967 | A1 | 6/2012 | Leonard | |
| 2012/0284185 | A1* | 11/2012 | Mettler | G06Q 20/0425 705/44 |
| 2012/0324009 | A1* | 12/2012 | Lee | H04L 51/32 709/204 |
| 2013/0066624 | A1* | 3/2013 | Pattan | G06F 17/289 704/2 |
| 2014/0123261 | A1* | 5/2014 | Blair | H04L 51/00 726/7 |
| 2014/0143675 | A1* | 5/2014 | Lee | H04L 67/10 715/739 |
| 2014/0282543 | A1* | 9/2014 | Ignatchenko | G06F 9/45558 718/1 |
| 2014/0310777 | A1* | 10/2014 | Truskovsky | H04L 63/0823 726/4 |
| 2014/0351163 | A1* | 11/2014 | Tussy | G06Q 10/083 705/330 |
| 2015/0033017 | A1* | 1/2015 | Uliyar | H04L 9/08 713/171 |
| 2015/0094106 | A1* | 4/2015 | Grossman | H04M 1/72552 455/466 |
| 2015/0213460 | A1* | 7/2015 | Anderson | G06Q 30/0185 705/318 |
| 2015/0280921 | A1* | 10/2015 | Geoffrey | H04L 9/0866 713/176 |
| 2015/0312183 | A1* | 10/2015 | Hu | H04L 67/2823 715/752 |
| 2016/0004820 | A1* | 1/2016 | Moore | H04L 63/1441 705/3 |
| 2016/0048313 | A1* | 2/2016 | Weil | H04L 51/10 715/723 |
| 2016/0072778 | A1* | 3/2016 | Panton | H04W 76/14 713/171 |
| 2016/0080295 | A1* | 3/2016 | Davies | H04L 51/32 709/204 |
| 2016/0191252 | A1* | 6/2016 | Li | H04L 9/3066 380/28 |
| 2017/0034581 | A1* | 2/2017 | Short | H04N 21/4126 |
| 2017/0063977 | A1* | 3/2017 | Jalwadi | H04L 41/0213 |
| 2017/0104764 | A1* | 4/2017 | Ramakrishnan | H04L 63/123 |
| 2017/0148032 | A1* | 5/2017 | Corniuk | G06Q 30/018 |
| 2017/0171615 | A1* | 6/2017 | Xiang | H04N 21/42684 |
| 2017/0324567 | A1* | 11/2017 | Matsuo | G06F 21/44 |
| 2017/0374504 | A1* | 12/2017 | Synal | H04W 4/021 |
| 2018/0034643 | A1* | 2/2018 | Yang | H04L 9/3263 |

OTHER PUBLICATIONS

European Application No. 18158223.0—1218; Extended European Search Report dated Jul. 6. 2018; 5 pages.

Globalsign, 2005, "What is an Extended Validation Certificate", globalsign.com, [online]. available from: https://web.archive.org/web/20150502033719/https://www.globalsign.com/en/ssl-information-center/what-is-an-extended-validation-certificate/[Accessed Jul. 4, 2018] Section "How can I recognise websites using EV SSL Certificates?"

GSM Mobile SMS/MMS using Public Key Infrastructure: m-PKI. [Nor et al]. published Aug. 2008, available from: https://www.researchgate.net/publication/228779441_GSM_mobile_SMSMMS using_public_key_infrastructure m-PKI [ accessed Jul. 4, 2018] See section 3: "m-PKI Solution".

Microsoft, 2006, Understanding S/MIME, technet.microsoft.com., [online], See the section "Verifying a digital signature of an e-mail message".

British Application No. GB1802909.0;Examination Report Under Section 18(3); dated Jun. 17, 2019; 5 pages.

British Patent Application No. GB1802909.0; Examination Report Under Section 18(3); dated Nov. 4, 2019.

\* cited by examiner

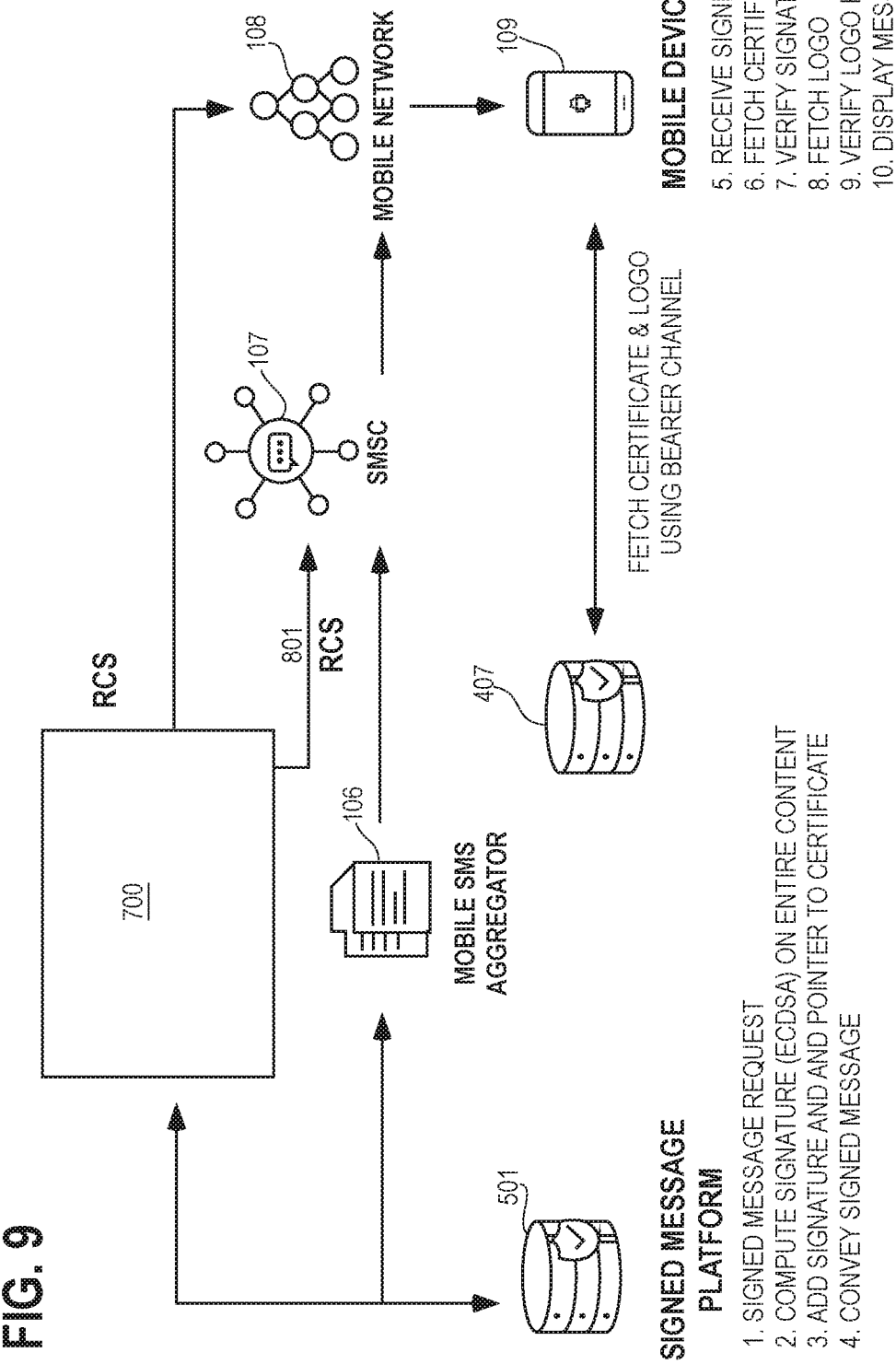

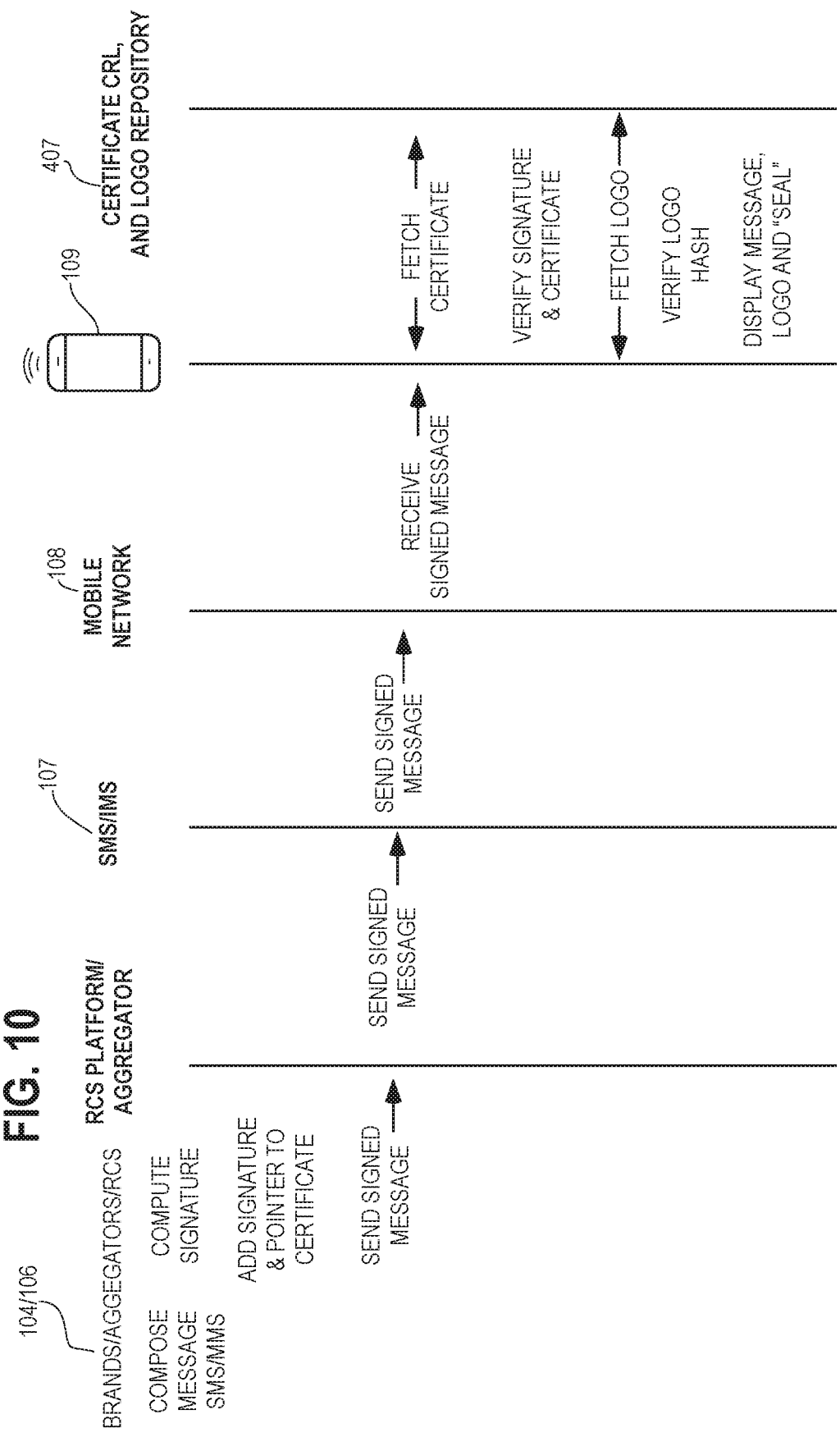

MOBILE MESSAGE SOURCE AUTHENTICATION

RELATED APPLICATION(S)

This application claims the benefit of U.S. Provisional application No. 62/462,185, filed Feb. 22, 2017, which is incorporated by reference in its entirety herein.

This application claims the benefit of U.S. Provisional application No. 62/548,630, filed Aug. 22, 2017, which is incorporated by reference in its entirety herein.

This application claims the benefit of U.S. Provisional application No. 62/554,799, filed Sep. 6, 2017, which is incorporated by reference in its entirety herein.

TECHNICAL FIELD

These teachings relate generally to mobile messaging such as short message service (SMS), multimedia messaging service (MMS), and rich communications services (RCS).

BACKGROUND

Mobile messaging is a well-developed and popular communications tool. Whether merely textual or rich with multimedia capabilities, mobile messaging can be a very effective way to provide various kinds of informational content. As a result, mobile messaging provides good opportunities for product and service providers to inform and otherwise develop relationships with their customers.

Unfortunately, such opportunities are sometimes exploited by third parties in favor of mischievous, misleading, and or fraudulent messages that misrepresent the source of the message. For example, an SMS message may appear to be from a particular bank when in fact the message is sourced by criminals seeking to elicit compromising information from the message recipient.

As the foregoing inappropriate behaviors become more common, the users of mobile receivers become more suspicious of their incoming messages. As a result, the potential for helpful and useful interactions between product/service providers and their customers via mobile messaging can be stymied.

BRIEF DESCRIPTION OF THE DRAWINGS

The above needs are at least partially met through provision of the apparatus for facilitating mobile message source authentication described in the following detailed description, particularly when studied in conjunction with the drawings, wherein:

FIG. 9 comprises a block diagram as configured in accordance with various embodiments of the invention;

FIG. 10 comprises a call flow diagram as configured in accordance with various embodiments of these teachings.

Figure 1:
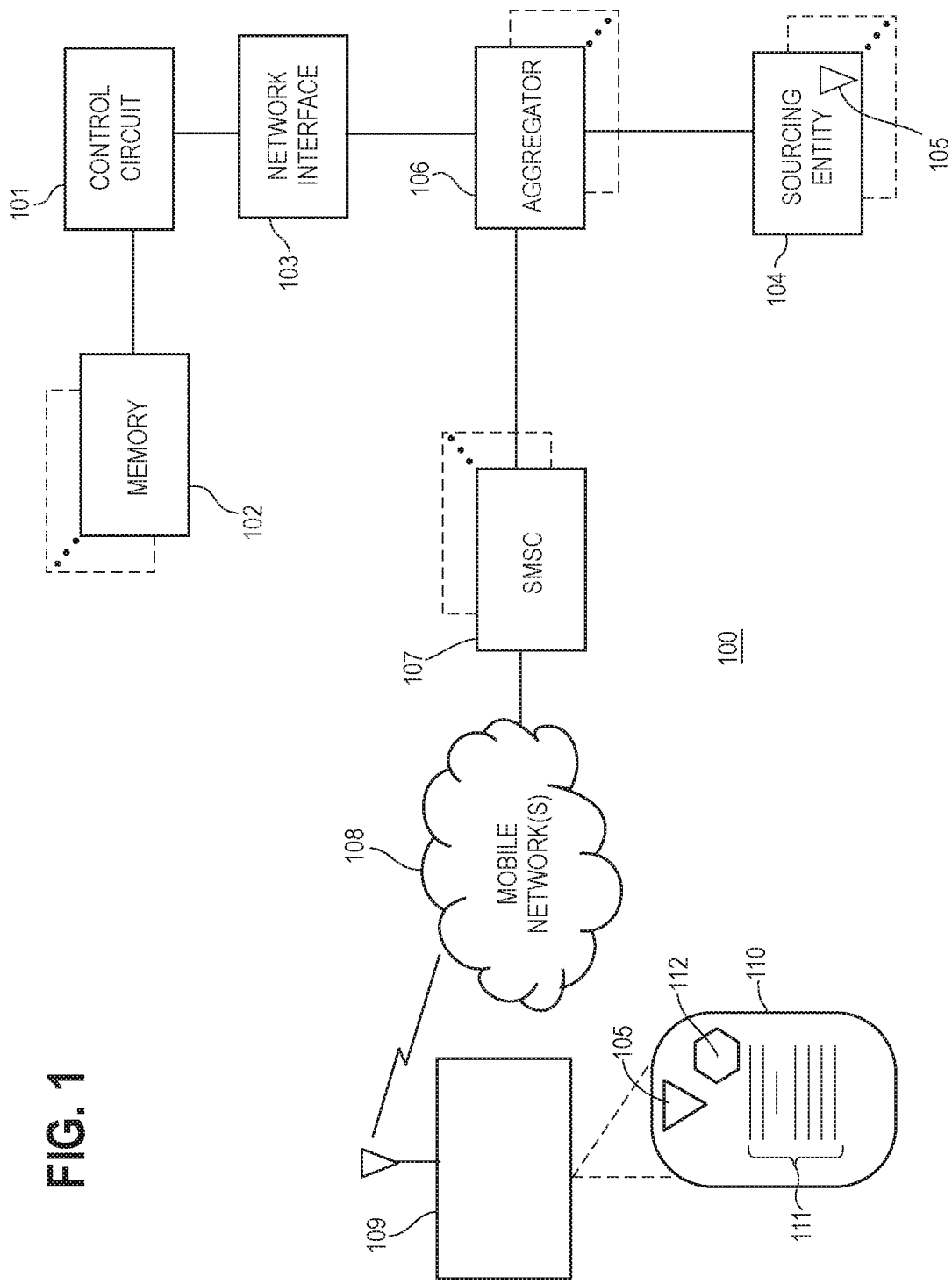
FIG. 1 comprises a block diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, these various embodiments serve to facilitate authentication of mobile messages sourced by corresponding sourcing entities that each have a corresponding entity logo. A control circuit receives from a mobile receiver a request for a certificate for a particular sourcing entity and responsively transmits to that mobile receiver a certificate. The certificate includes an entity logo that corresponds to a particular message sourcing entity and decryption information.

Pursuant to these teachings the mobile receiver can decrypt an encrypted authenticated entity digital signature to thereby authenticate that a mobile message that included the signature was sourced by a particular one of the sourcing entities and to also display the entity logo in conjunction with presenting the message sourced by the sourcing entity to thereby provide visual confirmation that the sourcing entity is indeed an authenticated source of the message.

By one approach, presentation of the entity logo as described above can be in combination with an additional graphic feature that specifically and uniquely represents and communicates that confirmed authentication (i.e., that the displayed logo in fact corresponds to the entity that sourced the message).

By one approach the control circuit is also configured to provide a certificate that is at least partially included in a mobile message through a digital signature that is sourced by the corresponding sourcing entity. That certificate can be used by the mobile receiver to further confirm that the sourcing entity is the authenticated source of the message.

These teachings are flexible in practice and will accommodate use with various mobile messaging protocols and standards such as SMS and MMS. If desired, these teachings can also be compatibly employed with RCS messaging. By one approach, if desired, the control circuit can be configured to select between transmitting a particular message using RCS compatible messaging or non-RCS compatible messaging. This selection can be based, for example, on presence information for the target mobile receiver.

So configured, these teachings permit messages sourced by such entities to be readily received in a way that permits the represented source of the message to be confidently authenticated. Furthermore, these teachings provide a simple but powerfully intuitive visual confirmation to express such authentication such that the message recipient can readily and quickly ascertain the authenticated status for the sourcing entity. Those skilled in the art will appreciate that these teachings can be economically deployed in a manner that is highly backwards compatible with many legacy protocols and systems while also readily accommodating next generation messaging protocols. It will also be appreciated that these teachings are highly scalable and will accommodate an essentially unbounded number of sourcing entities.

These and other benefits may become clearer upon making a thorough review and study of the following detailed description. Referring now to the drawings, and in particular to FIG. 1, an illustrative apparatus 100 that is compatible with many of these teachings will now be presented.

In this particular example, the enabling apparatus 100 includes a control circuit 101. Being a "circuit," the control circuit 101 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 101 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 101 is configured (for example, by using corresponding programming as will be well understood by those skilled in the art) to carry out one or more of the steps, actions, and/or functions described herein.

In this example the control circuit 101 operably couples to a memory 102. This memory 102 may be integral to the control circuit 101 or can be physically discrete (in whole or in part) from the control circuit 101 as desired. This memory 102 can also be local with respect to the control circuit 101 (where, for example, both share a common circuit board, chassis, power supply, and/or housing) or can be partially or wholly remote with respect to the control circuit 101 (where, for example, the memory 102 is physically located in another facility, metropolitan area, or even country as compared to the control circuit 101). It will also be understood that this memory 102 can itself be comprised of a plurality of physically discrete memories.

In addition to the certificate and logo information described herein, this memory 102 can serve, for example, to non-transitorily store the computer instructions that, when executed by the control circuit 101, cause the control circuit 101 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

In this example the control circuit 101 also operably couples to a network interface 103. So configured the control circuit 101 can communicate with other elements (both within the apparatus 100 and external thereto) such as the aggregators and wireless receivers described herein via the network interface 103. As but one example in these regards, the network interface 103 provides a mechanism by which the control circuit 101 can respond to requests for certificates to facilitate the decoding of digital signatures as described herein. Network interfaces, including both wireless and non-wireless platforms, are well understood in the art and require no particular elaboration here.

This apparatus 100 will service essentially any number of sourcing entities 104. For the sake of an illustrative example it will be presumed here that these sourcing entities 104 are retailers or manufacturers providing goods and/or services (directly or indirectly) to customers. In addition to typically having one or more identifying names, each such sourcing entity 100 for is presumed here to also possess an entity logo 105 (represented schematically here by a triangle). Such logos 105 will typically comprise a textual or non-textual graphic element and/or font. The present teachings will accommodate essentially any kind or style of logo.

The foregoing sourcing entities 104 are communicatively coupled to one or more aggregators 106. In this example these aggregators 106 are message aggregators that serve to receive messages from a plurality of sourcing entities 104 and forward those messages to corresponding mobile receivers. To facilitate this capability, in this example the aggregators 106 operably couple to a short message service center (SMSC) 107. An SMSC comprises a network element that serves to store, forward, convert, and deliver Short Message Service (SMS) messages. In particular, the SMSC 107 couples to one or more mobile networks 108 that wirelessly forward the SMS messages to the corresponding target mobile receivers 109.

In this example the control circuit 101 serves as a certificate of authority. So configured, and in response to specific requests by an aggregator 106, the control circuit 101 provides a corresponding certificate that the aggregator 106 can then employ in conjunction with the delivery of a corresponding message. As will be described in more detail below, these certificates correspond to particular previously registered sourcing entities 104.

These certificates can include various informational items. For example, a given certificate can include information regarding one or more of a unique number (such as a serial number), an identifying name for the entity that issues the certificate (i.e., the certificate authority), a validity period, an identifying name for the messaging aggregator 106, a public security key, and/or a private security key.

By one approach the certificate comprises an x.509 certificate (the latter being well understood in the art). By another approach, the certificate comprises a hashed digital signature (where, for example, the hashed digital signature comprises a digital signature that is hashed via elliptical curve-based hashing). Such a hashed digital signature may, for example, constitute 70 bites and therefore often fit within the payload space available in a typical SMS message.

So configured, and with continued reference to the example shown in FIG. 1, the control circuit 101 can provide to a mobile receiver 109 (via the network interface 103 and the functionality of the aggregator 106) an encrypted authenticated digital entity signature and pointer to retrieve, for example, an X.509 certificate for a particular one of the sourcing entities 104 in conjunction with transmission of a message sourced by that particular sourcing entity 104. The mobile receiver 109 can then retrieve the Certificate and decrypt the encrypted authenticated digital entity signature and encrypted version of the logo 105 to thereby recover the authenticated version of the entity logo 105.

The digital signature, upon being decrypted, can be used by the mobile receiver 109 to confirm the particular sourcing entity 104 as the authenticated source of the message.

For the sake of clarity, and by one approach, the entity logo 105 can be contained in the certificate (such as an X.509 certificate) as retrieved by the mobile receiver 109 in response to the reception of a message containing the digital signature. By one approach the certificate also contains a key (such as a public key) that the mobile receiver 109 can employ to decode the digital signature in the message sent by the aggregator/source.

As schematically shown, the mobile receiver 109 can also employ its display 110 to present the authenticated version of the entity logo 105 in conjunction with presenting the message 111 that was sourced by the sourcing entity 104. Presentation of the logo 105 provides a visual and simple confirmation regarding the authenticated source of the message.

If desired, these teachings will accommodate also presenting, in combination with the entity logo 105, an additional graphic feature 112 that specifically represents that confirmed authentication. Such an additional graphic feature 112 might comprise, for example, an icon of a padlock.

Figure 2:
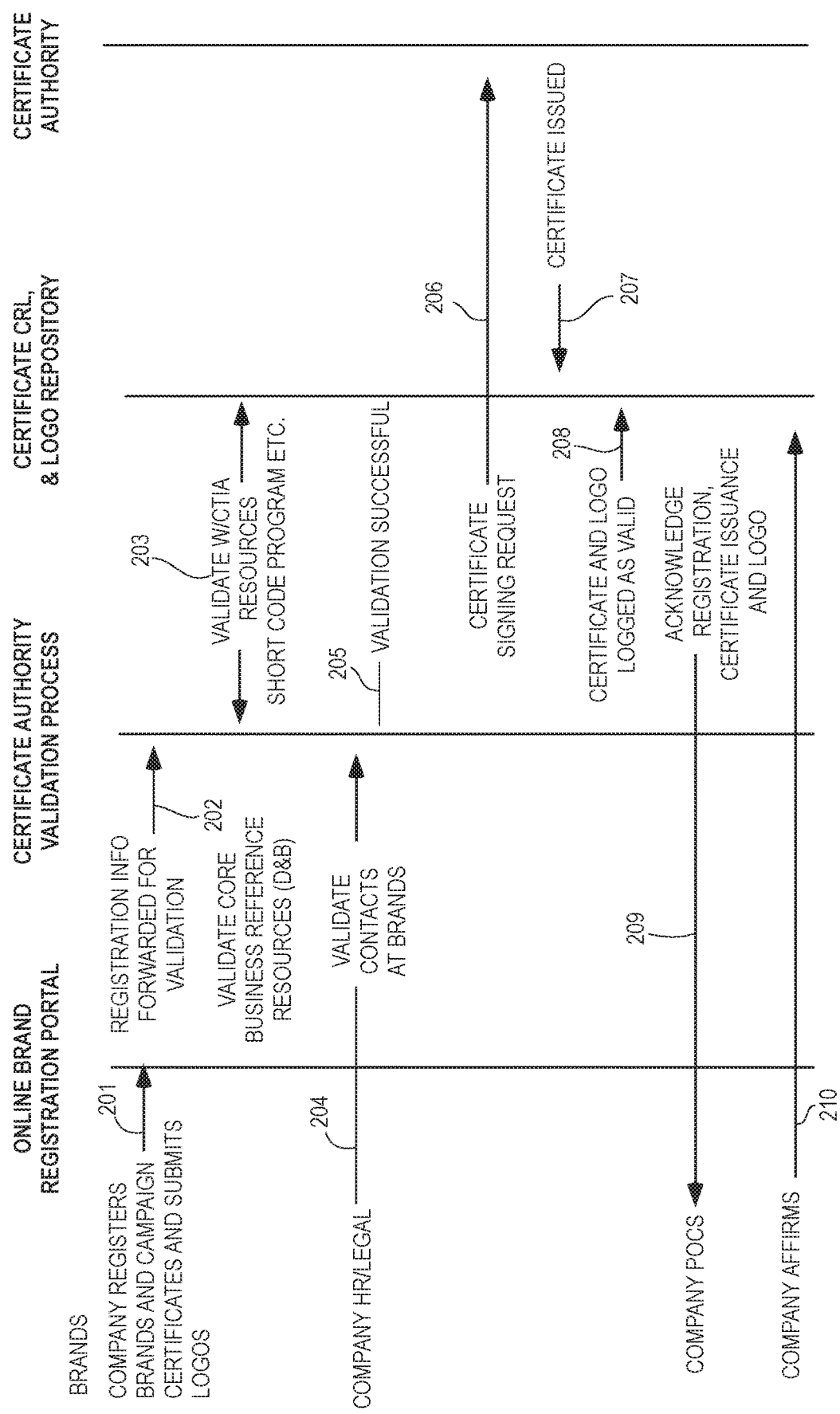
FIG. 2 comprises a call flow diagram as configured in accordance with various embodiments of these teachings.

FIG. 2 presents an illustrative example detailing certificate creation. It will be understood that no particular limitations are intended by way of the specific details of this example.

At step 201, the sourcing entities 104 register their brands and campaign certificates (if any) and also submit their logos 105 to an online brand registration portal (which may or may not include the aforementioned control circuit 101, in whole or in part as desired). At step 202 the latter then forwards registration information for validation to a certificate authority validation process (the latter again potentially comprising the control circuit 101). By one approach, the sourcing entity 104 can be validated by referencing third-party resources such as information from a trusted resource such as Dun & Bradstreet.

At step 203 the certificate authority validation process can also exchange information with a certificate CRL function and logo repository. CRL refers to a certificate revocation list containing digital certificates that have been revoked by the issuing certificate authority before their scheduled expiration date and which should no longer be trusted. Using this approach, a registration may be denied or at least subjected to further vetting in view of past history concerning the sourcing entity 104.

At step 204 the sourcing entity 104 provides contact information to the certificate authority validation process for one or more responsible contact persons at the sourcing entity 104. Presuming the foregoing steps are all successful, at step 205 the certificate authority validation process is successful. At step 206 the certificate authority receives a certificate signing request and, at step 207, issues the corresponding certificate. At step 208 the certificate CRL and logo repository function logs the certificate and logo as being valid. At step 209 the previously identified points of contact at the sourcing entity 104 receive acknowledgment of the registration and certificate issuance. And at step 210 the sourcing entity 104 affirms receipt of the foregoing information, thus completing the registration process.

Figure 3:
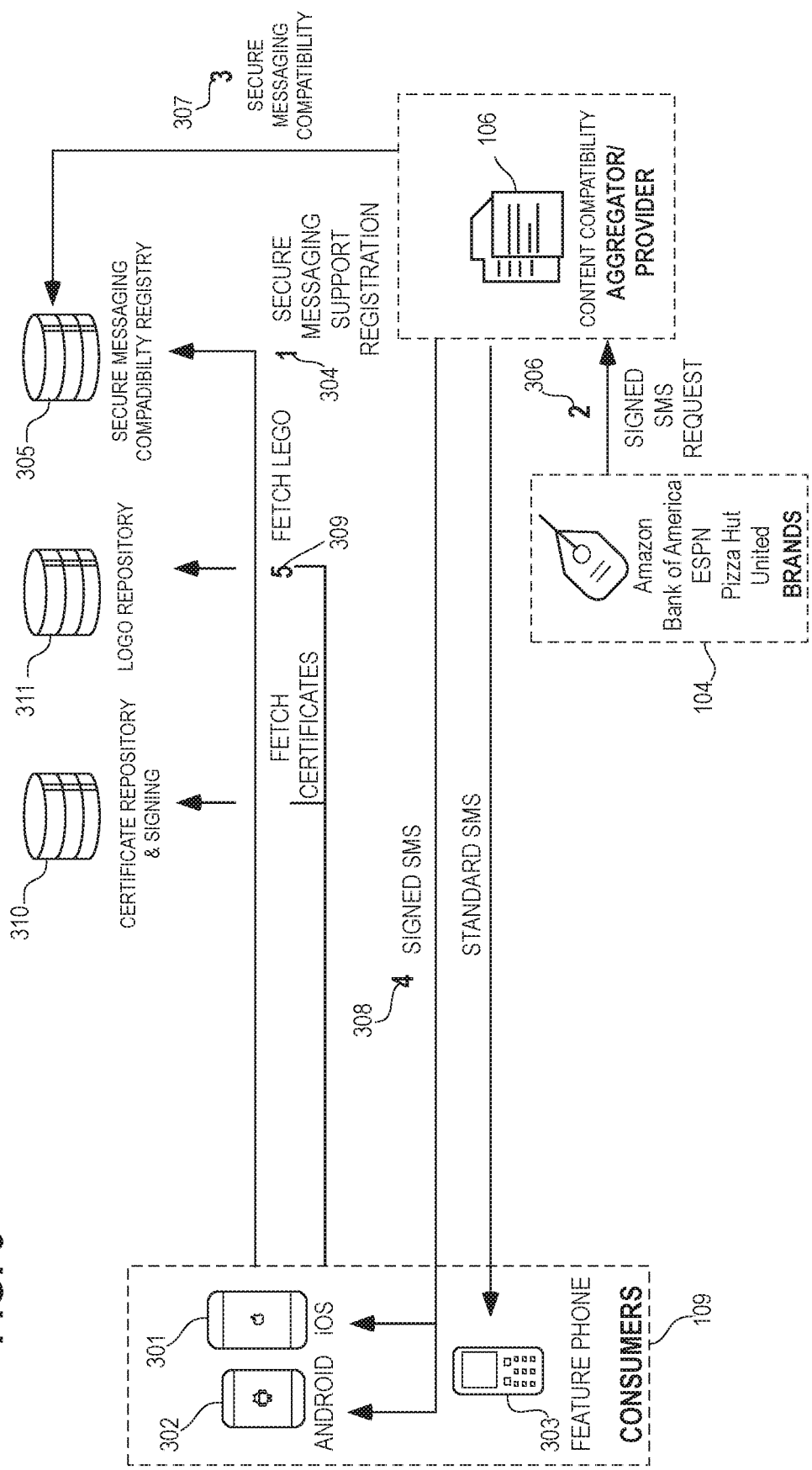
FIG. 3 comprises a block diagram as configured in accordance with various embodiments of these teachings.

FIG. 3 presents an illustrative example of employing these teachings in the context of SMS mobile messaging. This figure illustrates that these teachings will accommodate a variety of different mobile receivers 109 including iPhones 301 that are compatible with signed SMS, phones 302 that employ the Android or iOS operating systems and that are compatible with signed SMS, and other phones 303 that may only be compatible with standard SMS. At step 304 in this example, the mobile receiver 109 is first turned on by the consumer after being removed from its original packaging or the relevant compatible capability is newly installed on the mobile receiver 109 such that the mobile receiver 109 seeks to initially register with the corresponding secure messaging compatibility registry 305. Using this approach, these teachings can avoid attempting to burden a non-capable device with content the latter is unable to process.

At step 306, a sourcing entity 104 forwards a message to an aggregator 106 that is to be sent to a list of recipients (i.e., target mobile receivers 109). At step 307 the aggregator 106 queries the secure messaging compatibility registry 305 to identify any of the recipients that are not capable of receiving the message per these teachings. This information can also serve, if desired, to identify any recipients that are only capable of receiving standard SMS messages as versus signed SMS messages.

At step 308, the aggregator 106 sends the message as a signed message over the appropriate bearer channel to those mobile receivers 109 that are capable of compatibly receiving signed SMS messages. The content of these messages includes, for example, the digital signature content described herein. At step 309, the mobile receivers 109 contact the secure messaging platform repository, and in particular the certificate repository 310 and logo repository 311, to fetch the relevant certificate information and logo to validate the aforementioned digital signature. (This activity overall can include decoding the hashed logo in the certificate). Upon confirming the authenticated status of the corresponding sourcing entity 104, the recipient mobile receiver 109 can then present the message content to the user.

Figure 4:
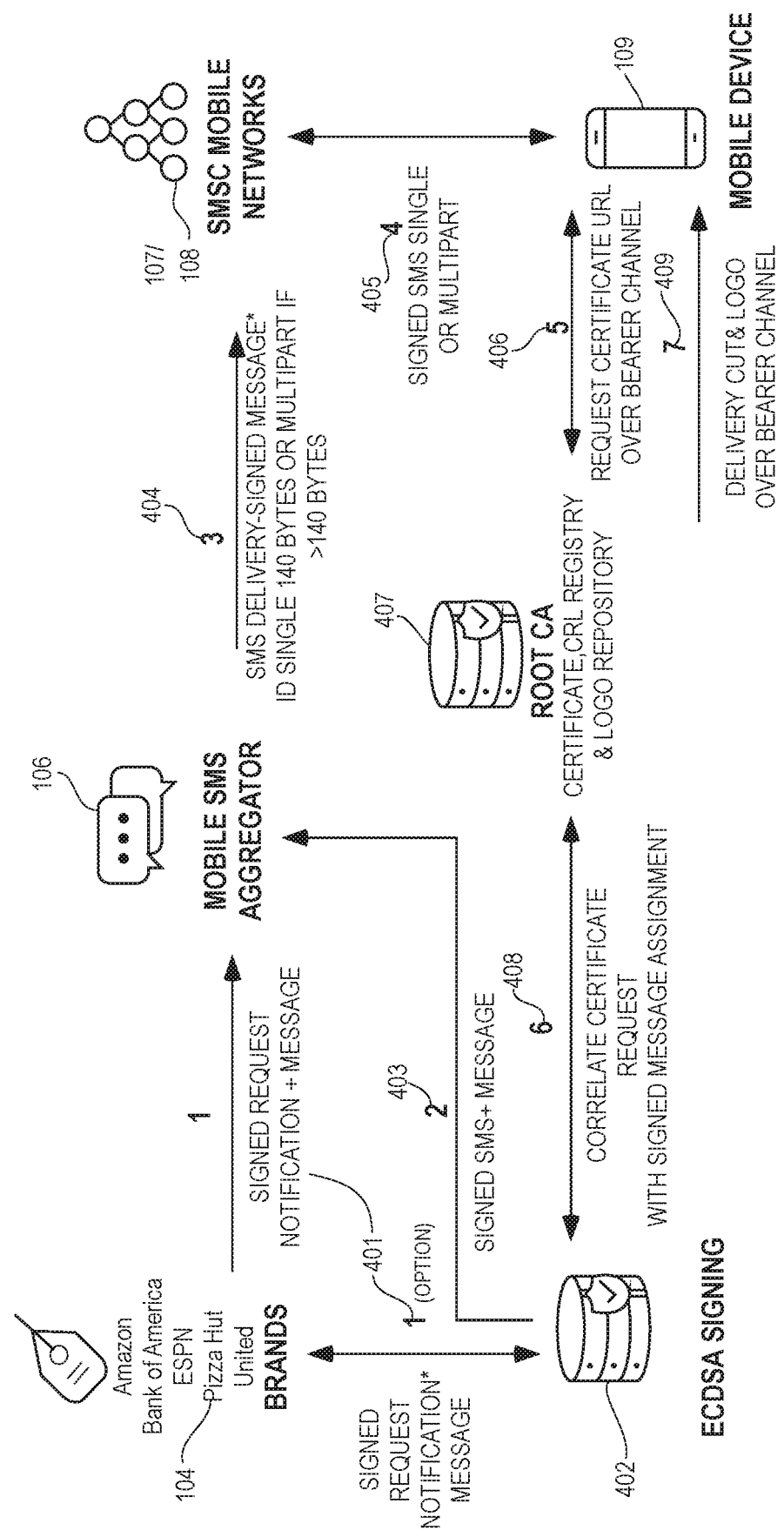
FIG. 4 comprises a block diagram as configured in accordance with various embodiments of these teachings.

FIG. 4 presents some further optional details in these regards. At step 401, the sourcing entity 104 forwards a signed request notification and the message to the mobile aggregator 106 and also optionally communicates with an elliptical curve digital signature algorithm (ECDSA) signing function 402. This activity can provide for hashing the digital signature described herein using elliptical curve-based hashing. Various approaches in these regards are well understood in the prior art and require no further embellishment here.

At step 403 the signed SMS and message are provided to the aggregator 106 after being processed by the ECDSA signing function 402. At step 404 the aggregator 106 forwards the signed message for SMS delivery via intervening SMSC mobile networks 107/108 to the recipient mobile devices 109 at step 405. These teachings contemplate including the aforementioned digital signature along with the signed message as the payload of the SMS message. If the total payload of that message plus the digital signature is less than 140 bytes a single message will suffice. If the aggregate total exceeds 140 bytes, the message can be sent as a multipart message in accordance with well understood prior art technique.

At step 406, the mobile device 109 contacts the certificate authority 407 and requests a certificate uniform resource locator over a bearer channel. The certificate authority 407 cooperates with the ECDSA signing function 402 at step 408 to correlate the certificate request with the signed message assignment. Presuming a positive result, at step 409 the certificate authority 407 delivers the certificate and logo over the bearer channel to the mobile device 109.

Figure 5:
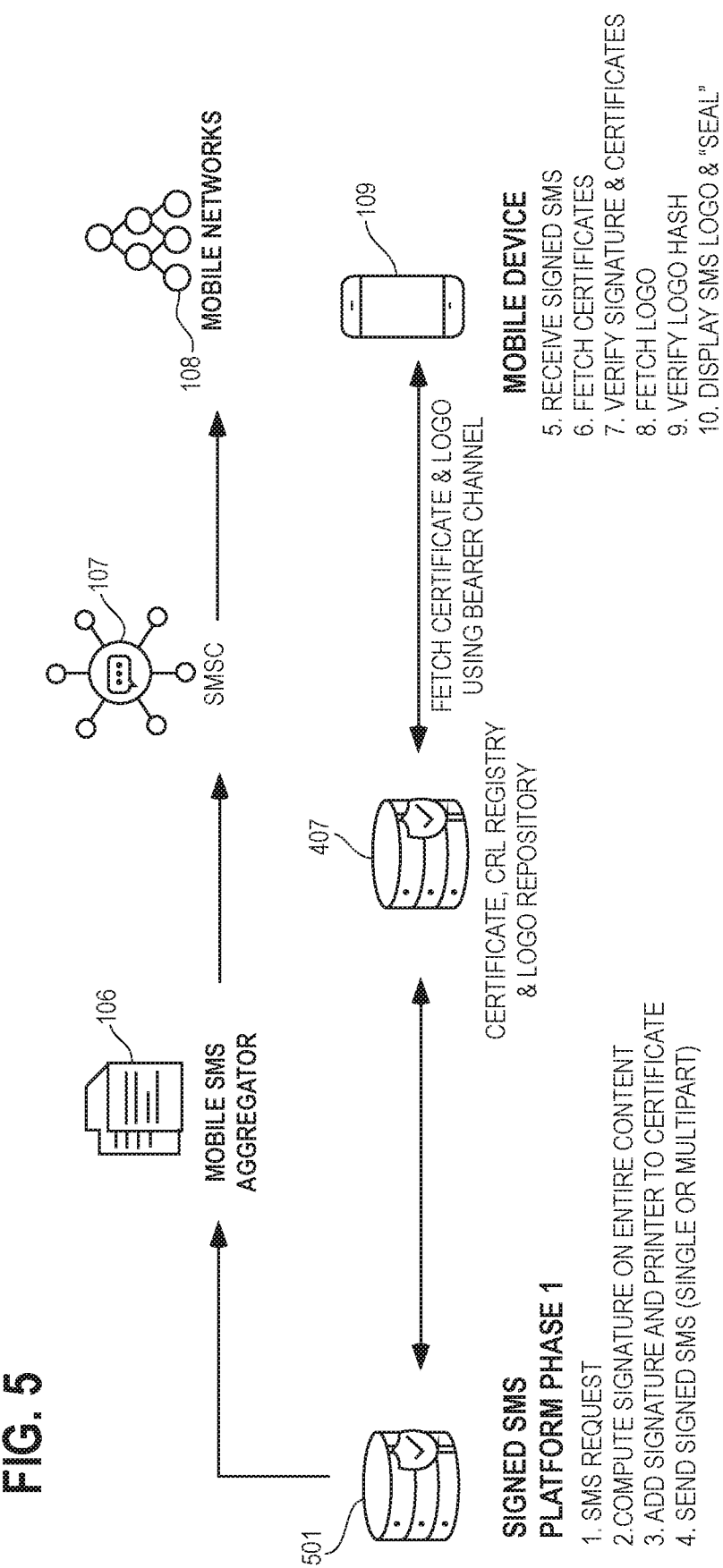
FIG. 5 comprises a block diagram as configured in accordance with various embodiments of these teachings.
Figure 6:
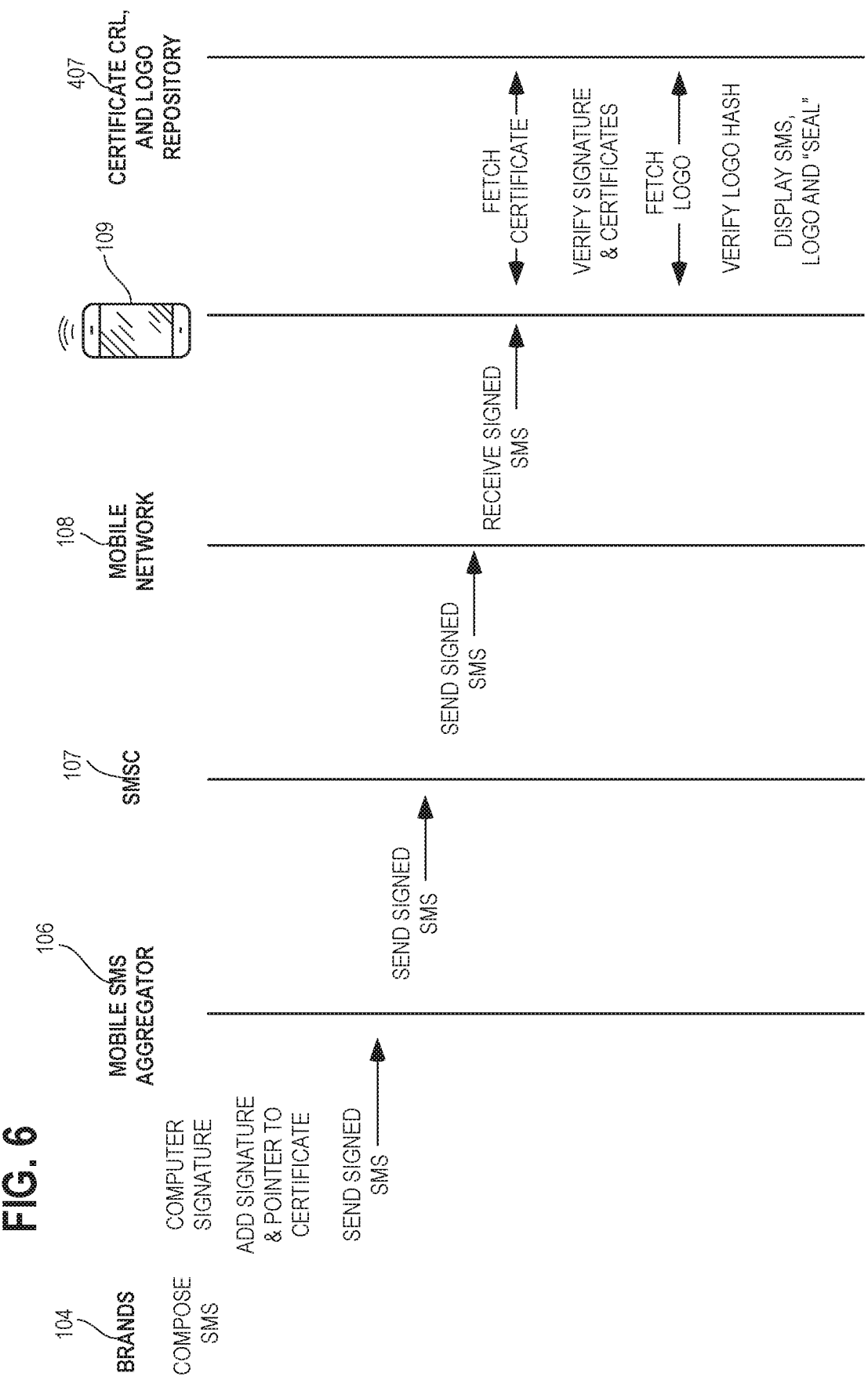
FIG. 6 comprises a call flow diagram as configured in accordance with various embodiments of these teachings.

FIGS. 5 and 6 present a simplified view in these regards. As shown, a signed SMS platform 501 forms SMS requests, computes digital signatures based upon the entire content of the message, adds the computed signature and a pointer to the certificate, and sends single or multipart signed SMS messages for transmittal to recipient mobile receivers 109. The latter, in turn, serve to receive those signed SMS messages, to fetch the corresponding certificates and verify the signature and certificates (through interactions with the certificate authority 407), fetch the corresponding logo and verify the logo hash, and ultimately display the logo (and verifying seal as described above with respect to reference numeral 112).

Those skilled in the art will appreciate that the foregoing examples well exemplify use of these teachings with respect to SMS (and MMS) messaging. These teachings are highly flexible in practice, however, and can also be employed with other messaging protocols. An example in these regards will now be provided to demonstrate use of these teachings with rich communications services (RCS).

Figure 7:
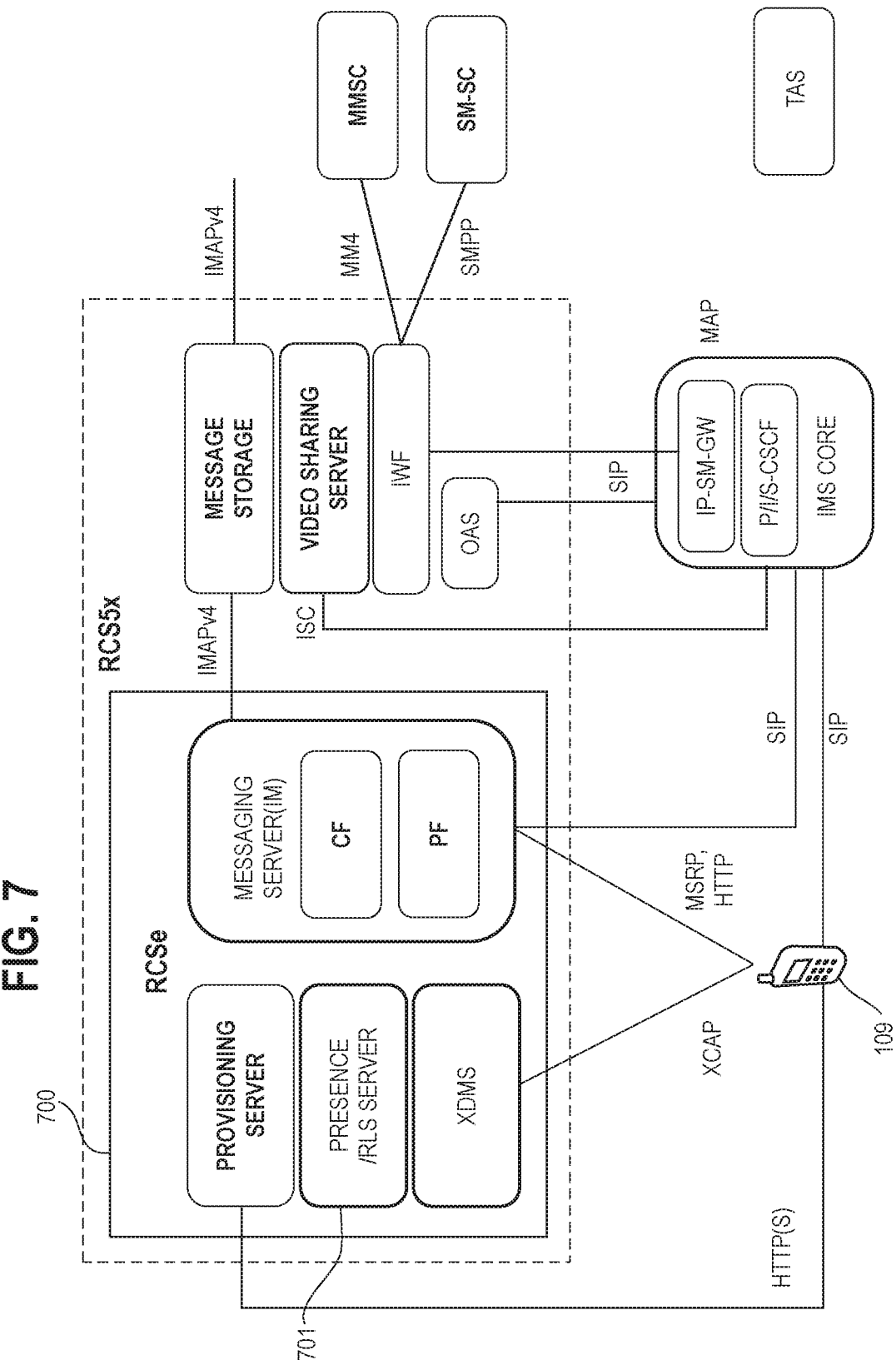
FIG. 7 comprises a block diagram as configured in accordance with various embodiments of the invention.

FIG. 7 presents an illustrative RCS system 700 in a suitable application setting. While many of the acronyms in this figure are well understood by those skilled in these arts, for convenience a number of these acronyms shall be understood to have the following meanings:

RCSe—an extension to the basic RCS approach to accommodate new capabilities;

RCS5.x—the RCS standard for servers and other infrastructure;

RLS server—resource lists server is a server that allows subscriptions to lists of users and complements the functionality of the presence server;

XDMS—a protocol to facilitate communications between servers and user devices;

CF—control function (effected typically by corresponding logic);

PF—policy function;

IMAPv4—IMAP protocol communication with message service;

ISC—instant message service serving control;

IWF—interworking function (this function essentially serves to translate from one communications protocol to another);

OAS—operations administration and support;

SIP—session initiation protocol;

IP-SM-GW—Internet protocol short message gateway (this gateway takes in message traffic from the indicated sources and supports transmitting content (likely mostly video content in this application setting though textual content can also be accommodated as received from the SM-SC using the MAP protocol) to the mobile receiver 109 using SIP;

CSCF—call session control function (P refers to proxy, I refers to interrogating, and S refers to serving);

TAS—telephony application server;

XCAP—XML configuration access protocol;

MSRP and HTTP—communication protocols by which a message is sent.

The architecture shown in FIG. 7 generally serves to effect RCS-based messaging to mobile receivers 109. These network elements and their functionality is understood in the art and does not require further elaboration here.

Figure 8:
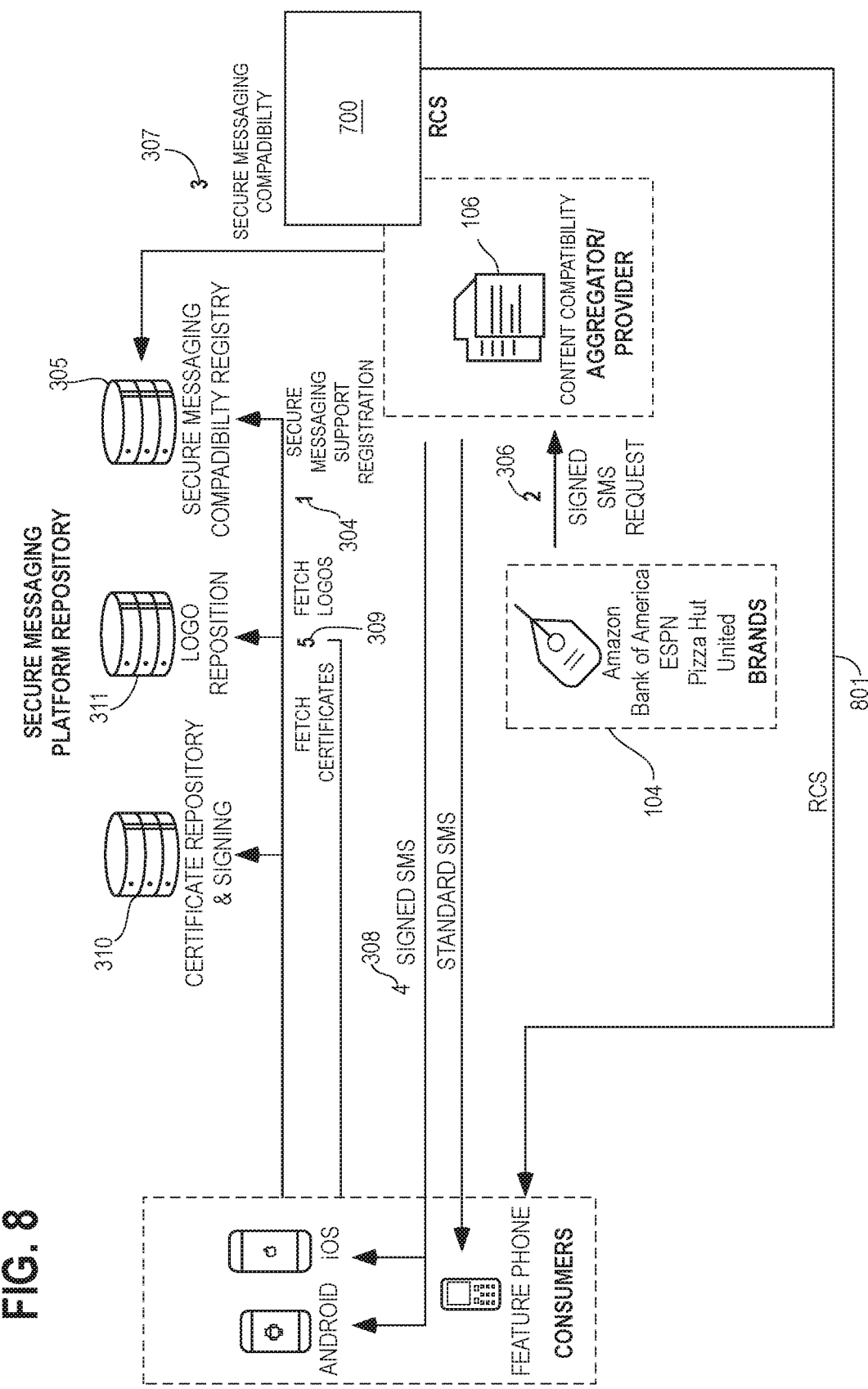
FIG. 8 comprises a block diagram as configured in accordance with various embodiments of these teachings.

FIG. 8 presents the same operational paradigm as shown in the above-described FIG. 3 with the exception that now an RCS delivery capability 700 is also available for use to provide the same messaging content to the mobile receivers 109 (presuming compatible reception capabilities) using RCS 801. So configured, and referring to information stored in the compatibility registry 305, such a system can decide whether to use RCS compatible messaging or non-RCS compatible messaging depending upon whether a particular target recipient mobile receiver 109 can compatibly receive RCS compatible messaging.

By one approach, these teachings will also accommodate selecting between transmitting the above-described message content using RCS compatible messaging or non-RCS compatible messaging as a function, at least in part, of presence information for the recipient mobile receiver 109. Referring momentarily again to FIG. 7, such presence information can be accessed via the presence/RLS server 701.

FIG. 9 presents the system view shown in FIG. 5 with the addition of an ability to utilize RCS messaging as an available alternative to non-RCS messaging. Similarly, FIG. 10 presents the call flow approach shown in FIG. 6 with the addition of RCS messaging as an available messaging protocol.

Generally speaking, these teachings provide for allowing aggregators to request and use (by embedding) digital certificates. These digital certificates can be readily embedded within the existing mobile messaging protocols such as SMS and MMS.

These teachings provide a secure, trustworthy, relatively transparent approach to confirming the source of a mobile message and to communicate that authentication in a simple and effective manner to the user. The suggested digital certificate in particular can provide an effective approach to assuring that content is from a verified source. Those skilled in the art will appreciate that, to a very large extent, these teachings and benefits are technology neutral and can be readily implemented across a wide variety of carrier networks. It will also be appreciated that these teachings can leverage existing legacy systems and do not require a wholesale replacement of existing network elements and/or protocols. If desired, these teachings will readily accommodate a variety of encryption approaches to provide further security with respect to transmitted content.

Those skilled in the art will recognize that a wide variety of modifications, alterations, and combinations can be made with respect to the above described embodiments without departing from the scope of the invention. As one simple example in these regards, the logo 105 for a particular sourcing entity 104 may comprise a three-dimensional element. Presuming the target mobile receiver has a three-dimensional presentation capability, the authenticated logo provided by these teachings to the mobile receiver can also comprise a corresponding three-dimensional element. Accordingly, such modifications, alterations, and combinations are to be viewed as being within the ambit of the inventive concept.

What is claimed is:

1. An apparatus to facilitate authentication of mobile messages sourced by corresponding sourcing entities that each have a corresponding entity logo, comprising:

a network interface;

a control circuit operably coupled to the network interface and configured to:

receive from a mobile receiver a request for a certificate for a particular sourcing entity;

transmit to the mobile receiver the certificate, wherein the certificate includes:

an entity logo that corresponds to the particular sourcing entity; and decryption information;
such that the mobile receiver can:
    decrypt an encrypted entity digital signature to thereby authenticate that a mobile message that included the encrypted entity digital signature was sourced by a particular one of the sourcing entities; and
    display the entity logo from the certificate with an additional graphic feature in conjunction with presenting the mobile message to thereby visually confirm the particular one of the sourcing entities as being an authenticated source of the message, wherein the additional graphic feature specifically and uniquely represents and communicates that the displayed entity logo in fact corresponds to the entity that sourced the mobile message.

2. The apparatus of claim 1 wherein the control circuit is further configured to provide a certificate revocation list that is used to provide security for the particular one of the sourcing entities as an authenticated source of the message.

3. The apparatus of claim 1 wherein the certificate comprises an x.509 certificate.

4. The apparatus of claim 1 wherein the certificate comprises a hashed digital signature.

5. The apparatus of claim 4 wherein the hashed digital signature comprises a digital signature that is hashed via elliptical curve-based hashing.

6. The apparatus of claim 4 wherein the hashed digital signature constitutes 70 bytes.

7. The apparatus of claim 1 wherein the certificate includes information regarding at least one of:
  a unique number;
  an identifying name for an entity that issues the certificate;
  a validity period;
  an identifying name for a messaging aggregator;
  a public security key;
  a private security key.

8. The apparatus of claim 1 wherein the control circuit is further configured to facilitate transmission of the message sourced by the particular one of the sourcing entities to the mobile receiver using Rich Communication Services (RCS) compatible messaging.

9. The apparatus of claim 8 wherein the control circuit is further configured to select between transmitting the message sourced by the particular one of the sourcing entities to the mobile receiving using RCS compatible messaging and non-RCS compatible messaging.

10. The apparatus of claim 9 wherein the non-RCS compatible messaging comprises at least one of Short Message Service (SMS) compatible messaging and Multimedia Messaging Service (MMS) compatible messaging.

11. The apparatus of claim 9 wherein the control circuit is configured to select between transmitting the message sourced by the particular one of the sourcing entities to the mobile receiving using RCS compatible messaging and non-RCS compatible messaging as a function, at least in part, of presence information for the mobile receiver.

12. A method to facilitate authentication of mobile messages sourced by corresponding sourcing entities that each have a corresponding entity logo, comprising:
  receiving a message sourced by a particular one of the sourcing entities to be transmitted as a mobile message to a target mobile receiver;
  transmitting to the target mobile receiver an encrypted authenticated digital entity signature and encrypted version of an entity logo for the particular one of the sourcing entities in conjunction with transmission of the message, such that the mobile receiver can decrypt the encrypted authenticated digital entity signature and encrypted version of the digital entity signature and logo to recover the authenticated version of the entity logo and display the authenticated version of the entity logo with an additional graphic feature in conjunction with presenting the message sourced by the particular one of the sourcing entities to thereby confirm the particular one of the sourcing entities as an authenticated source of the message, wherein the additional graphic feature specifically and uniquely represents and communicates that the displayed entity logo in fact corresponds to the entity that sourced the mobile message.

\* \* \* \* \*